United States Patent [19]

Li et al.

[11] 4,066,717
[45] Jan. 3, 1978

[54] THERMOPLASTIC RESIN COMPOSITIONS COMPRISING POLYINDENE OR COUMARONE-INDENE RESIN

[75] Inventors: George S. Li, Aurora; Irving Rosen, Warrensville Heights, both of Ohio

[73] Assignee: The Standard Oil Company, Cleveland, Ohio

[21] Appl. No.: 644,122

[22] Filed: Dec. 24, 1975

[51] Int. Cl.$^2$ ............................................. C08L 25/06
[52] U.S. Cl. .................................. 260/874; 260/873; 260/876 R; 260/892; 260/893; 260/897 A; 260/899; 260/901
[58] Field of Search ................. 260/829, 874; 526/280

[56] References Cited

U.S. PATENT DOCUMENTS 3,639,499  2/1972  Snodgrass et al. .................. 260/829

OTHER PUBLICATIONS

Mamedaliev et al. — Plast. Massy, 1974(7), 6–8, (Russ), Chem. Abstract, vol. 81, 1974 — 153223x.
Aliev et al. — 1968 — (Russ), Chem. Abstract, vol. 72, 1970 — 32944p.
Lyapina — Kauch Rezina, 1969, 14–17, (Russ), Chem. Abstract, vol. 70, 1969 — 107271m.

*Primary Examiner*—Carman J. Seccuro
*Attorney, Agent, or Firm*—John F. Jones; Sherman J. Kemmer

[57] ABSTRACT

Certain physical properties, such as heat-distortion temperature and flexural modulus, of certain commercially available thermoplastic resins are improved by blending with polyindene or coumarone-indene resins.

2 Claims, No Drawings

THERMOPLASTIC RESIN COMPOSITIONS COMPRISING POLYINDENE OR COUMARONE-INDENE RESIN

The present invention relates to a method for improving physical properties of known commercially available thermoplastic synthetic resins by incorporating therein some polyindene and/or indene-coumarone resin and to the resulting blends.

Coumarone-indene resins and polyindene are well known, relatively inexpensive resins having been used for a variety of purposes in the past including as fillers or extenders for rubber, and in asphalt tile. Coumarone-indene resins and polyindene are inexpensive by-products of the coal tar industry which are usually prepared by the acid catalyzed polymerization of indene or coumarone-indene mixtures. Commercially available coumarone-indene copolymers are usually made from about 10% by weight of coumarone and about 90% by weight of indene, a mixture which occurs in coal tar residues.

We have discovered that some of the physical properties of certain well known commercially available thermoplastic resins, such as vinyl chloride homopolymers and copolymers, polyolefins including polypropylene, polyethylene, polystyrenes, polyesters including polyethylene terephthalate, ABS, MBS, polycarbonates, and the like, are dramatically improved by blending some polyindene and/or coumarone-indene resin with these materials.

In general, when from 1 to 50 parts, 5 to 30 parts preferred, by weight per hundred of resin (phr) of polyindene or coumarone-indene resin are blended with a resin of the aforementioned type, the physical properties including heat-distortion temperature, flexural modulus and other properties of the original resin are improved.

Thus, the blending of polyindene and/or coumarone-indene resins with certain commercial thermoplastic resins will generally lower the cost of the blend, give better processability, give higher heat-distortion temperature, give higher flexural modulus and in some cases give lower gas and vapor permeation rates to the blend.

According to the process of this invention, the blends of polyindene or coumarone-indene resin and polystyrene, for instance, can be made in any of a number of ways as by blending on a mill, in a banbury mixer or other type of internal mixer such as in a Brabender mixer.

In the following examples which further illustrate this invention, the amounts of the various materials listed are given in parts by weight unless otherwise specified.

EXAMPLE 1

A. Fifty parts of commercially available polyvinyl chloride were blended in a Brabender internal mixer at 210° C for 5 minutes with 7.5 parts of coumarone-indene resin (Cumar LX-509, Neville Chemical Company) (softening temperature of 120° C). Test specimens were molded from the blend.

B. Test specimens were molded as in A above from polyvinyl chloride.

The test specimens from A and B above were tested for ASTM (D-648) heat-distortion temperature (HDT) and ASTM flexural modulus with the following results:

| Specimen | HDT (° C) | Flexural Modulus (psi) |
| --- | --- | --- |
| A | 67 | $8.67 \times 10^5$ |
| B | 58 | $4.02 \times 10^5$ |

EXAMPLE 2

A. Fifty parts of commercially available polystyrene were blended in a Brabender internal mixer at 210° C for 5 minutes with 7.5 parts of coumarone-indene resin. Test specimens were molded from the blend.

B. Fifty parts of polystyrene were blended in a Brabender internal mixer at 210° C for 5 minutes with 7.5 parts of polyindene (prepared from indene in toluene with BF$_3$ initiator, softening temperature of 240° C). Test specimens were molded from the blend.

C. Test specimens were molded from polystyrene.

The test specimens from A, B and C of this example were tested for ASTM heat-distortion temperature (HDT) and ASTM flexural modulus with the following results:

| Specimen | HDT (° C) | Flexural Modulus (psi) |
| --- | --- | --- |
| A | 79 | $2.99 \times 10^5$ |
| B | 83 | $3.40 \times 10^5$ |
| C | 77 | $2.54 \times 10^5$ |

EXAMPLE 3

A. Fifty grams of commercially available polycarbonate were blended with 7.5 grams of polyindene at 230° C for 5 minutes in a Brabender internal mixer. Eight grams of this blend were compression molded at 215° C (6000 psi) to give a ⅛-inch test bar.

B. A test bar of the polycarbonate alone was prepared as in A above for comparison purposes. The following results were obtained:

| Specimen | HDT (° C) | Flexural Modulus (psi) |
| --- | --- | --- |
| A | 140 | $3.29 \times 10^5$ |
| B | 136 | $3.15 \times 10^5$ |

EXAMPLE 4

A. Fifty grams of commercially available polymethyl methacrylate were blended with 7.5 grams of coumarone-indene copolymer in an internal mixer. Test bars of the blend were then molded.

B. Test bars of the polymethyl methacrylate used in A above were prepared for comparison purposes. The following results were observed:

| Specimen | HDT (° C) | Flexural Modulus (psi) |
| --- | --- | --- |
| A | 91 | $4.63 \times 10^5$ |
| B | 85 | $4.11 \times 10^5$ |

EXAMPLE 5

A. Fifty grams of commercially available polyvinyl acetate were blended with 7.5 grams of coumarone-indene copolymer in an internal mixer. Test bars of the blend were then molded.

B. Test bars of the polyvinyl acetate used in A above were prepared for comparison purposes. The following results were obtained:

| Specimen | HDT (° C) | Flexural Modulus (psi) |
|----------|-----------|------------------------|
| A        | 40        | $10.2 \times 10^5$     |
| B        | <25       | $0.01 \times 10^5$     |

We claim:

1. A composition having improved physical properties comprising a blend of (A) 100 parts by weight of polystyrene and (B) from 1 to 50 parts by weight of polyindene.

2. The process comprising blending in an efficient blending apparatus a mixture of (A) 100 parts by weight of polystyrene and (B) from 1 to 50 parts by weight of polyindene.

* * * * *